(12) United States Patent
Drogi

(10) Patent No.: US 11,777,544 B2
(45) Date of Patent: Oct. 3, 2023

(54) POWER AMPLIFIER POWER DETECTION FOR INITIATING RETRAINING OF DIGITAL PRE-DISTORTION

(71) Applicant: Skyworks Solutions, Inc., Irvine, CA (US)

(72) Inventor: Serge Francois Drogi, Flagstaff, AZ (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/664,093

(22) Filed: May 19, 2022

(65) Prior Publication Data

US 2022/0393708 A1 Dec. 8, 2022

Related U.S. Application Data

(60) Provisional application No. 63/202,167, filed on May 28, 2021.

(51) Int. Cl.
*H04B 1/04* (2006.01)
*H04B 17/10* (2015.01)

(52) U.S. Cl.
CPC ......... *H04B 1/0475* (2013.01); *H04B 17/101* (2015.01); *H04B 2001/0425* (2013.01)

(58) Field of Classification Search
CPC .......... H04B 2001/0425; H04B 1/0475; H04B 1/04; H04B 1/40; H04B 17/15; H04B 17/101
USPC ........................................ 375/299, 295–297
See application file for complete search history.

(56) References Cited

U.S. PATENT DOCUMENTS

| | | | |
|---|---|---|---|
| 6,255,906 B1 | 7/2001 | Eidson et al. | |
| 6,614,854 B1 * | 9/2003 | Chow | H04L 27/368 332/162 |
| 7,202,736 B1 | 4/2007 | Dow et al. | |
| 7,276,973 B2 * | 10/2007 | Ripley | H03F 1/0272 330/296 |
| 7,385,447 B1 | 6/2008 | Adar | |
| 7,412,469 B2 | 8/2008 | Dalipi | |
| 7,443,236 B2 | 10/2008 | Dow et al. | |
| 7,937,049 B2 | 5/2011 | Phillips et al. | |
| 8,588,353 B2 * | 11/2013 | Yang | H03F 1/3294 370/335 |
| 9,048,802 B2 | 6/2015 | Firouzkouhi et al. | |

(Continued)

FOREIGN PATENT DOCUMENTS

CN 101330481 A * 12/2008

*Primary Examiner* — Emmanuel Bayard
(74) *Attorney, Agent, or Firm* — Knobbe, Martens, Olson & Bear, LLP

(57) ABSTRACT

Apparatus and methods for retraining digital pre-distortion are disclosed. In certain embodiments, a mobile device includes a transmit chain and a front end system. The transmit chain generates a transmit signal and converts the transmit signal to a radio frequency input signal, and includes a digital pre-distortion circuit that provides digital pre-distortion to the transmit signal. The front end system includes a power amplifier that amplifies the radio frequency input signal to generate a radio frequency output signal, and a power detector that generates a detection signal based on detecting an output power of the power amplifier. The detection signal controls initiation of a retraining sequence of the digital pre-distortion circuit.

20 Claims, 15 Drawing Sheets

(56) References Cited

U.S. PATENT DOCUMENTS

| | | | |
|---|---|---|---|
| 9,252,719 B2 | 2/2016 | Firouzkouhi et al. | |
| 9,258,156 B2 | 2/2016 | Wloczysiak | |
| 9,312,892 B2 | 4/2016 | Chang | |
| 9,461,596 B1 | 10/2016 | Ozard | |
| 9,730,165 B2 | 8/2017 | Ahmed et al. | |
| 9,755,577 B2 | 9/2017 | Firouzkouhi et al. | |
| 9,979,421 B2 | 5/2018 | Astrom et al. | |
| 10,574,028 B2 | 2/2020 | Wei et al. | |
| 10,637,515 B2 | 4/2020 | Kutz et al. | |
| 11,228,281 B2* | 1/2022 | Chang | H03F 1/0205 |
| 11,296,735 B1 | 4/2022 | Kutz et al. | |
| 2002/0101938 A1* | 8/2002 | Horaguchi | H03F 1/3247 |
| | | | 375/297 |
| 2005/0111574 A1* | 5/2005 | Muller | H03F 1/52 |
| | | | 375/296 |
| 2007/0129025 A1 | 6/2007 | Vasa et al. | |
| 2008/0051042 A1 | 2/2008 | Komaili et al. | |
| 2010/0099363 A1* | 4/2010 | Faust | H04B 17/10 |
| | | | 455/69 |
| 2012/0081178 A1* | 4/2012 | Shi | H03F 3/189 |
| | | | 330/149 |
| 2013/0027129 A1* | 1/2013 | Langer | H03F 1/56 |
| | | | 330/127 |
| 2015/0188499 A1* | 7/2015 | Tsai | H03F 3/24 |
| | | | 375/297 |
| 2017/0303118 A1 | 10/2017 | Ahmed et al. | |
| 2020/0067466 A1* | 2/2020 | Kushnir | H03F 3/245 |
| 2020/0169332 A1* | 5/2020 | Tervo | H04B 17/12 |
| 2021/0328609 A1 | 10/2021 | Gutman et al. | |
| 2021/0391832 A1* | 12/2021 | Barbu | H03F 3/245 |
| 2022/0190852 A1* | 6/2022 | Summerfield | H04B 1/0475 |
| 2022/0200540 A1* | 6/2022 | Kof | H03F 1/3247 |

\* cited by examiner

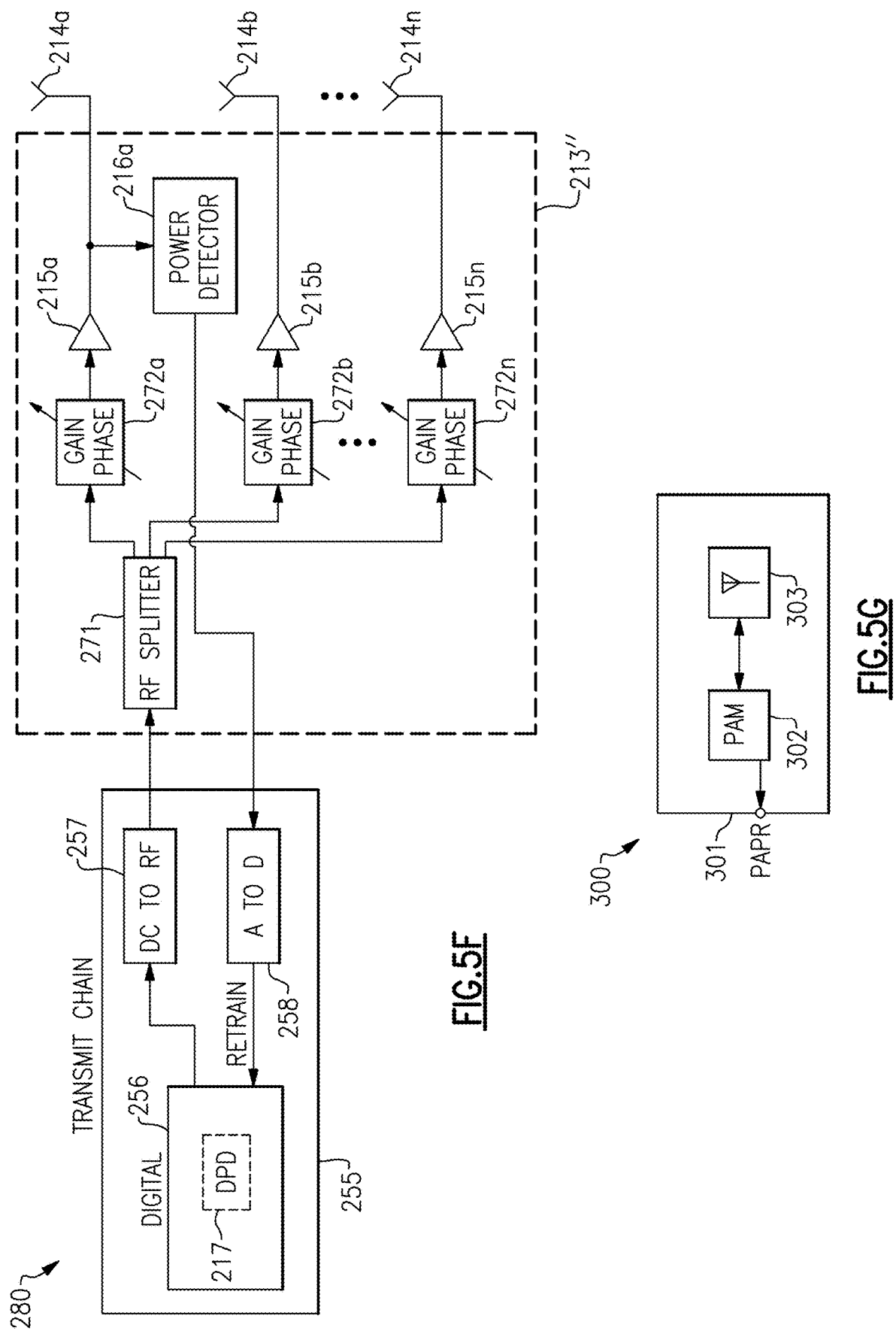

POWER AMPLIFIER POWER DETECTION FOR INITIATING RETRAINING OF DIGITAL PRE-DISTORTION

CROSS-REFERENCE TO RELATED APPLICATIONS

This application claims the benefit of priority under 35 U.S.C. § 119 of U.S. Provisional Patent Application No. 63/202,167, filed May 28, 2021 and titled "POWER AMPLIFIER POWER DETECTION FOR INITIATING RETRAINING OF DIGITAL PRE-DISTORTION," which is herein incorporated by reference in its entirety.

BACKGROUND

Field

Embodiments of the invention relate to electronic systems, and in particular, to power amplifiers for radio frequency (RF) electronics.

Description of the Related Technology

Power amplifiers are used in radio frequency (RF) communication systems to amplify RF signals for transmission via antennas. It can be important to manage the power of RF signal transmissions to prolong battery life and/or provide a suitable transmit power level.

Examples of RF communication systems with one or more power amplifiers include, but are not limited to mobile phones, tablets, base stations, network access points, laptops, and wearable electronics. Power amplifiers provide amplification to RF signals, which can have a frequency in the range from about 30 kHz to 300 GHz, for instance, in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

SUMMARY

In certain embodiments, the present disclosure relates to a mobile device. The mobile device includes a transmit chain configured to generate a transmit signal and to convert the transmit signal to a radio frequency input signal, the transmit chain including a digital pre-distortion circuit operable to provide digital pre-distortion to the transmit signal. The mobile device further includes a front end system including a first power amplifier configured to amplify the radio frequency input signal to generate a radio frequency output signal, and a power detector configured to generate a detection signal based on detecting an output power of the first power amplifier. The detection signal is operable to control initiation of a retraining sequence of the digital pre-distortion circuit.

In various embodiments, the power detector is a peak to average power detector.

In several embodiments, the mobile device further includes an antenna configured to transmit the radio frequency output signal. According to a number of embodiments, the detection signal is operable to initiate the retraining sequence in response to detecting a mismatch between the antenna and the first power amplifier.

In some embodiments, the front end system includes a plurality of power amplifiers including the first power amplifier, the mobile device further including an antenna array configured to radiate a transmit beam in response to receiving a plurality of radio frequency output signals from the plurality of power amplifier amplifiers. According to a number of embodiments, the front end system includes a plurality of power detectors each configured to provide output power detection to a corresponding one of the plurality of power amplifiers. In accordance with several embodiments, one or more of the plurality of power amplifiers are not coupled to any power detector.

In various embodiments, the transmit chain is configured to process the detection signal to generate a retraining control signal for the digital pre-distortion circuit.

In certain embodiments, the present disclosure relates to a radio frequency transmit system for a mobile device, the radio frequency transmit system including a digital pre-distortion circuit operable to provide digital pre-distortion to a transmit signal, a digital to radio frequency converter configured to convert the transmit signal to a radio frequency input signal, and a power amplifier module configured to output a detection signal operable to control initiation of a retraining sequence of the digital pre-distortion circuit. The power amplifier module includes a first power amplifier configured to amplify the radio frequency input signal to generate a radio frequency output signal, and a power detector configured to generate the detection signal based on detecting an output power of the first power amplifier.

In various embodiments, the power detector is a peak to average power detector.

In several embodiments, the radio frequency transmit system further includes an antenna configured to transmit the radio frequency output signal. According to a number of embodiments, the detection signal is operable to initiate the retraining sequence in response to detecting a mismatch between the antenna and the first power amplifier. In accordance with various embodiments, the antenna and the power amplifier module are implemented on a common radio frequency module.

In certain embodiments, the present disclosure relates to a method of digital pre-distortion in a mobile device. The method includes generating a transmit signal using a digital transmit circuit of a transmit chain, providing digital pre-distortion to the transmit signal using a digital pre-distortion circuit of the digital transmit circuit, converting the transmit signal to a radio frequency input signal using a digital to radio frequency converter of the transmit chain, amplifying the radio frequency input signal to generate a radio frequency output signal using a first power amplifier, and generating a detection signal based on detecting an output power of the first power amplifier using a power detector, the detection signal operable to control initiation of a retraining sequence of the digital pre-distortion circuit.

In various embodiments, generating the detection signal includes performing peak to average power detection.

In several embodiments, the method further includes transmitting the radio frequency output signal on an antenna. According to a number of embodiments, the method further includes using the detection signal to initiate the retraining sequence in response to detecting a mismatch between the antenna and the first power amplifier.

In some embodiments, the method further includes providing a plurality of radio frequency output signals from a plurality of power amplifier amplifiers to an antenna array, the plurality of power amplifiers including the first power amplifier.

In various embodiments, the method further includes providing output power detection for each of the plurality of power amplifiers.

In several embodiments, the method further includes providing output power detection for only a subset of the plurality of power amplifiers.

BRIEF DESCRIPTION OF THE DRAWINGS

FIG. 5F is a schematic diagram of a communication system according to another embodiment.

FIG. 5G is a schematic diagram of a radio frequency (RF) module according to one embodiment.

DETAILED DESCRIPTION OF EMBODIMENTS

Figure 1:
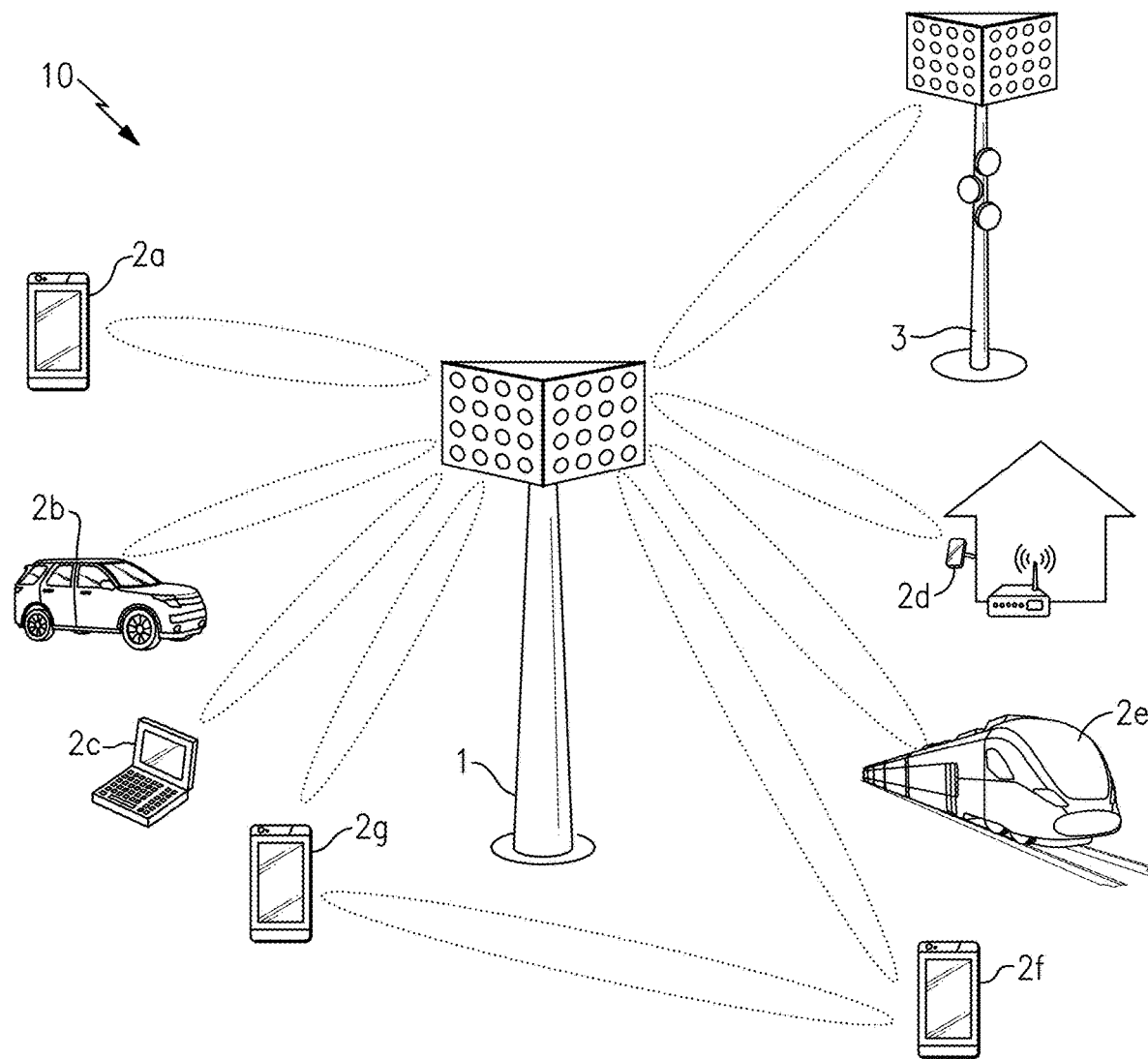
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
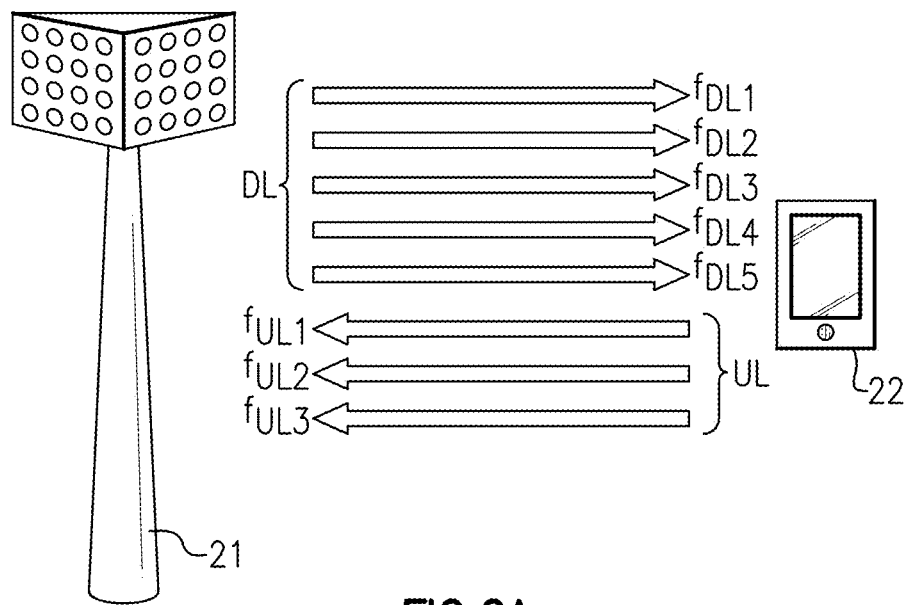
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
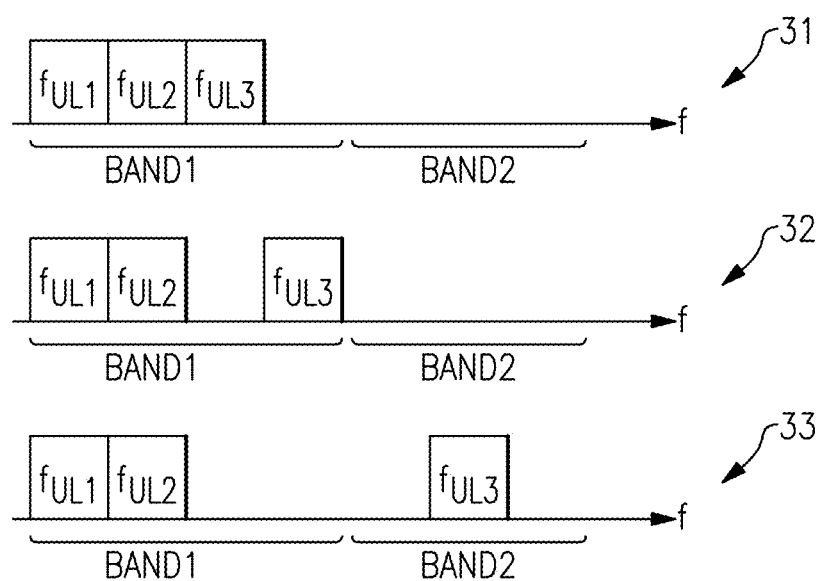
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
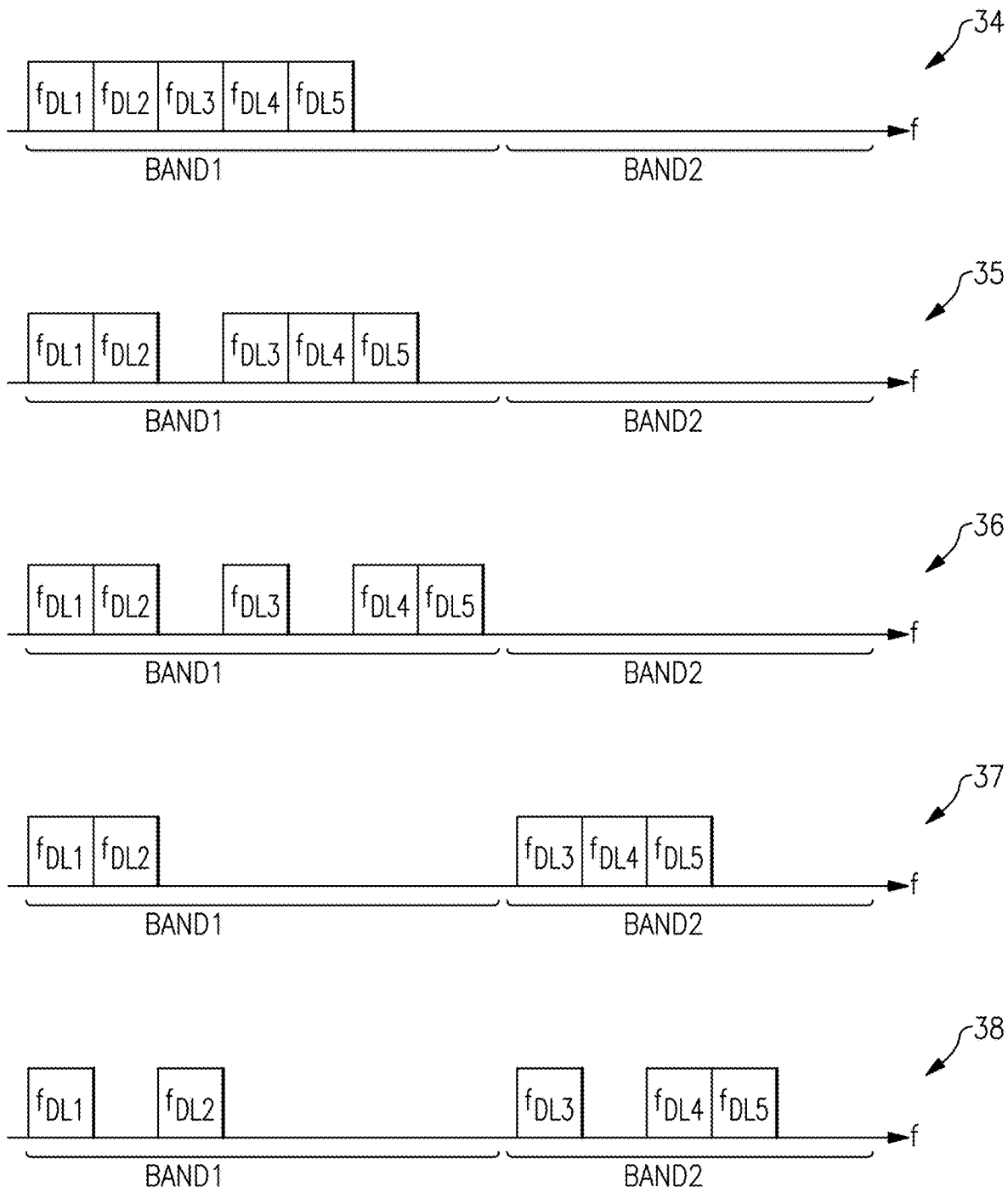
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
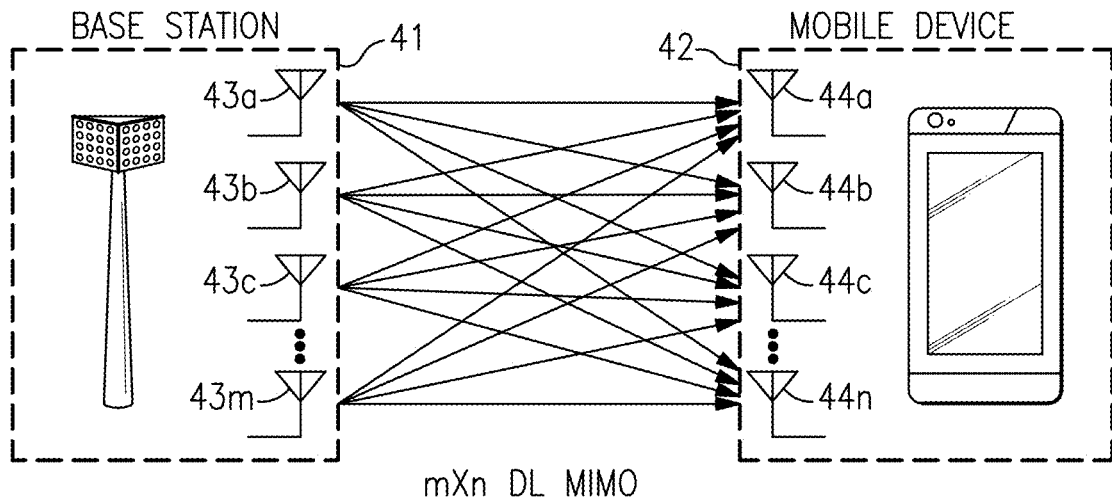
FIG. 3A is a schematic diagram of one example of a downlink channel using multi-input and multi-output (MIMO) communications.
Figure 3B:
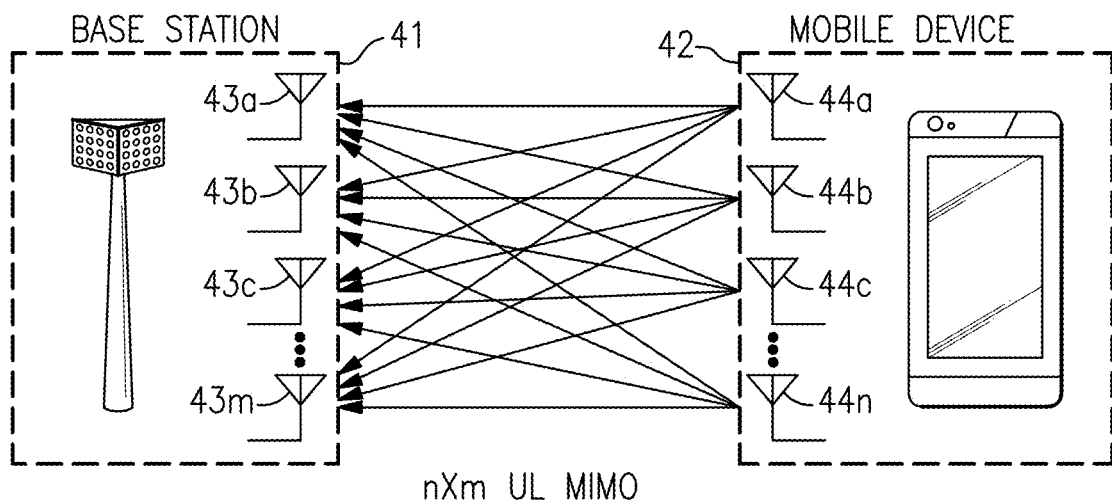
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas $43a$, $43b$, $43c$, ... $43m$ of the base station 41 and receiving using N antennas $44a$, $44b$, $44c$, ... $44n$ of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas $44a$, $44b$, $44c$, ... $44n$ of the mobile device 42 and receiving using M antennas $43a$, $43b$, $43c$, ... $43m$ of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
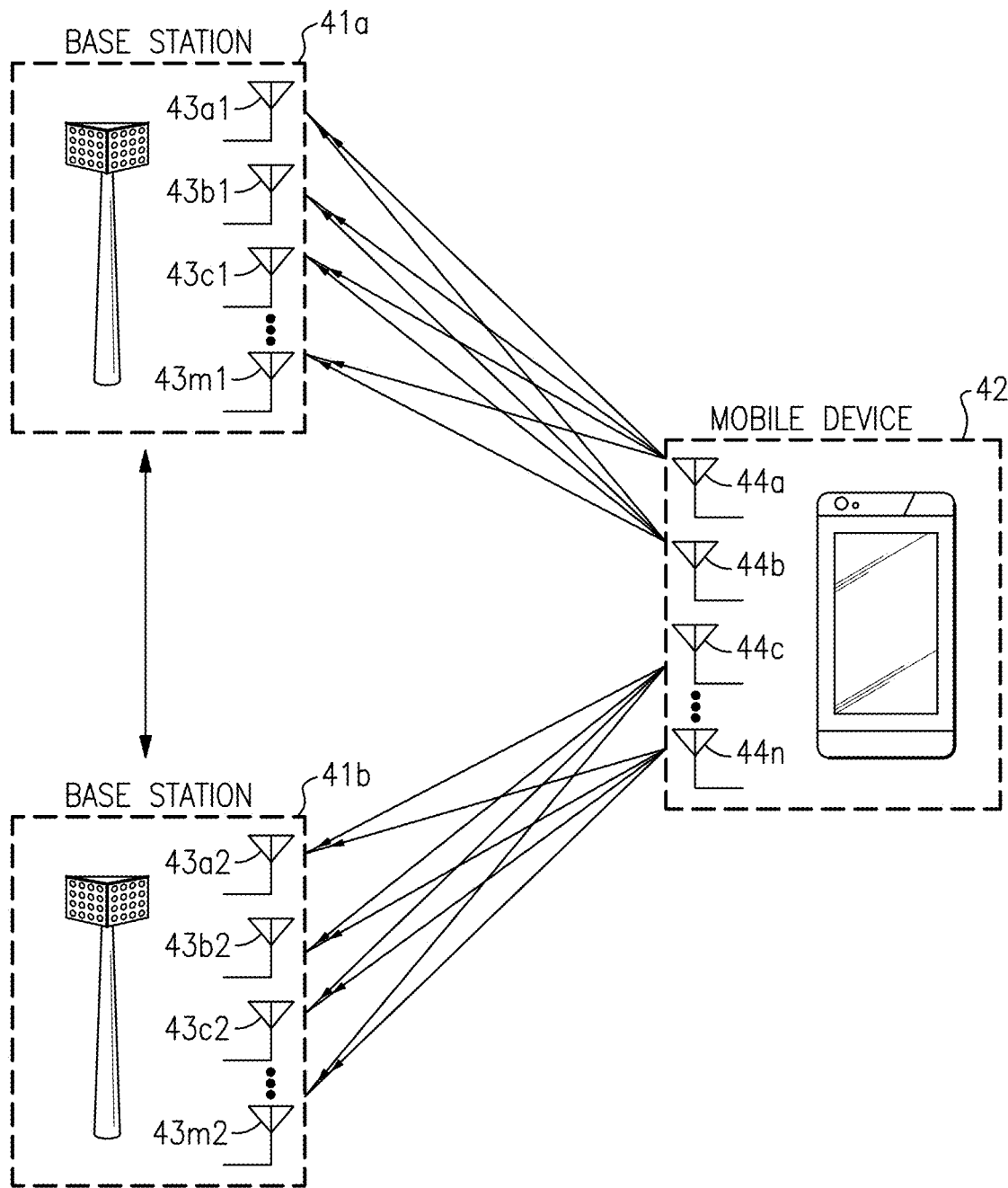
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas $44a$, $44b$, $44c$, ... $44n$ of the mobile device 42. Additional a first portion of the uplink transmissions are received using M antennas $43a1$, $43b1$, $43c1$, ... $43m1$ of a first base station $41a$, while a second portion of the uplink transmissions are received using M antennas $43a2$, $43b2$, $43c2$, ... $43m2$ of a second base station $41b$. Additionally, the first base station $41a$ and the second base station $41b$ communication with one another over wired, optical, and/or wireless links.

The MIMO scenario of FIG. 3C illustrates an example in which multiple base stations cooperate to facilitate MIMO communications.

Figure 4A:
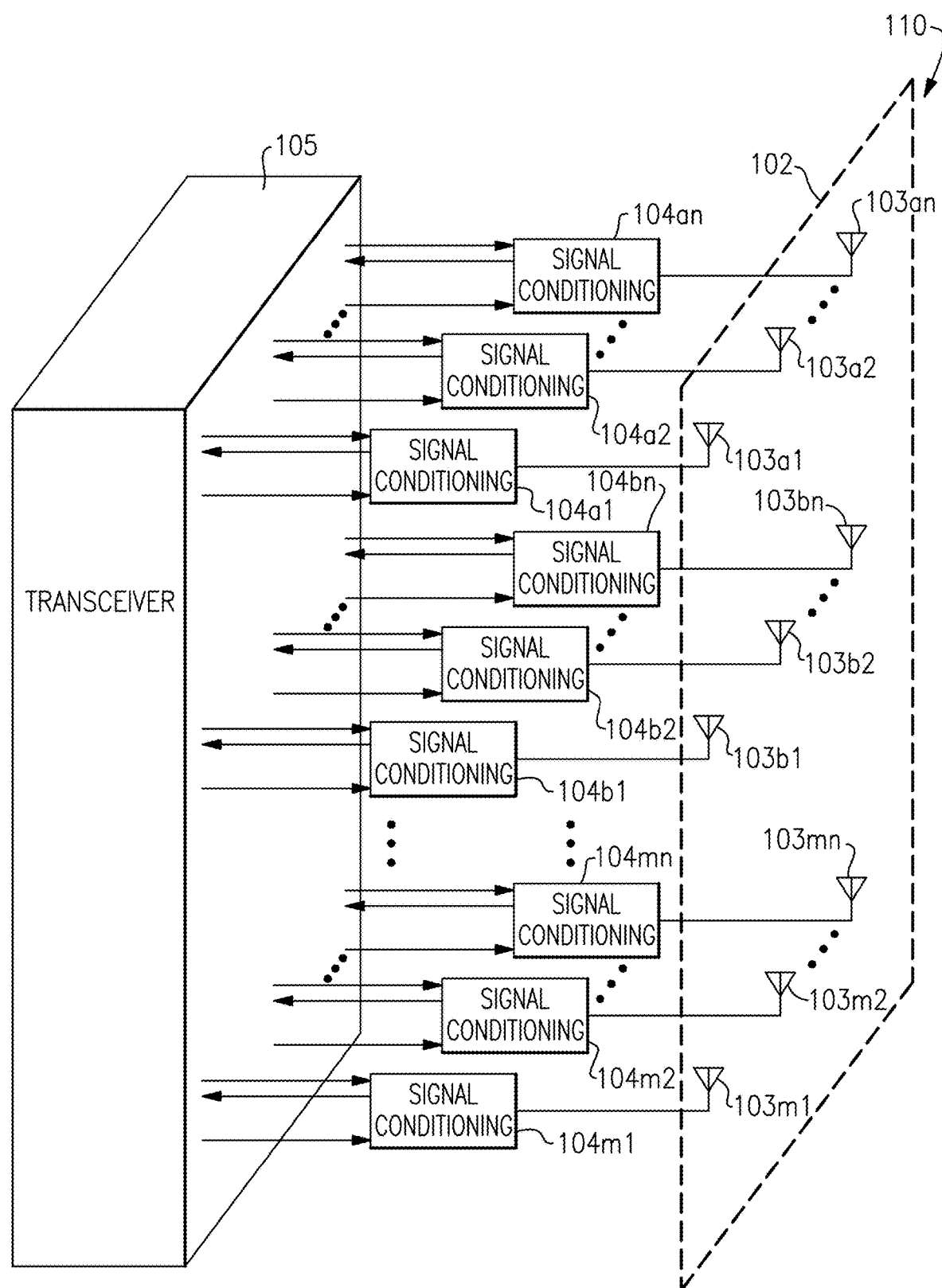
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits $104a1$, $104a2$ ... $104an$, $104b1$, $104b2$ ... $104bn$, $104m1$, $104m2$ ... $104mn$, and an antenna array 102 that includes antenna elements $103a1$, $103a2$ ... $103an$, $103b1$, $103b2$ ... $103bn$, $103m1$, $103m2$ ... $103mn$.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
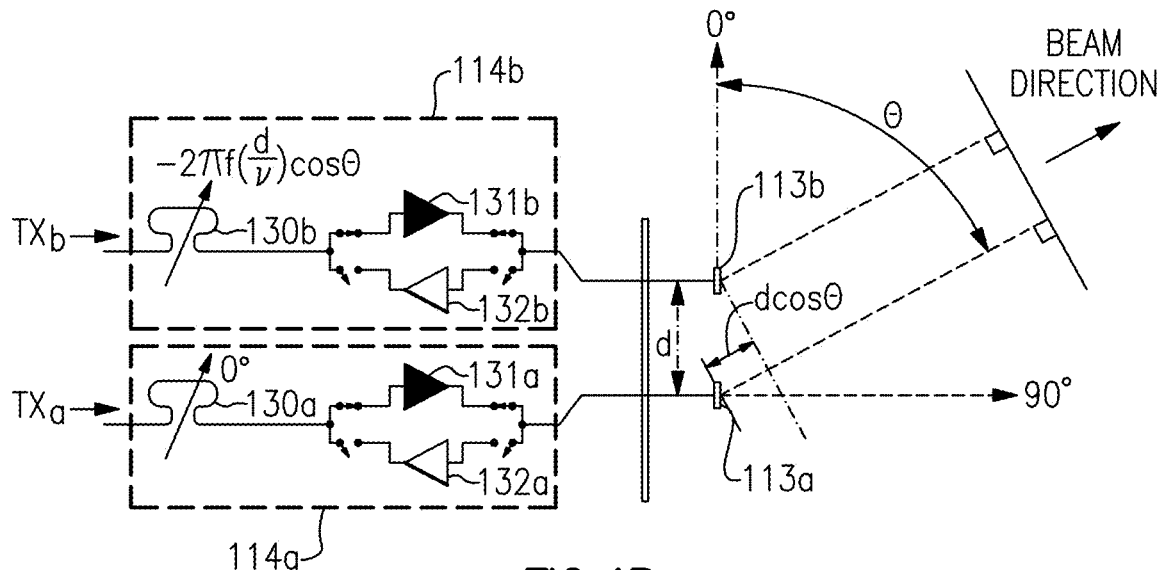
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 4B has been annotated with an angle Θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle Θ can be achieved. For example, when the first phase shifter 130a has a reference value of 0°, the second phase shifter 130b can be controlled to provide a phase shift of about $-2\pi f(d/v)\cos \Theta$ radians, where f is the fundamental frequency of the transmit signal, d is the distance between the antenna elements, v is the velocity of the radiated wave, and $\pi$ is the mathematic constant pi.

In certain implementations, the distance d is implemented to be about $\frac{1}{3}\lambda$, where $\lambda$ is the wavelength of the fundamental component of the transmit signal. In such implementations, the second phase shifter 130b can be controlled to provide a phase shift of about $-\pi \cos \Theta$ radians to achieve a transmit beam angle Θ.

Accordingly, the relative phase of the phase shifters 130a, 130b can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
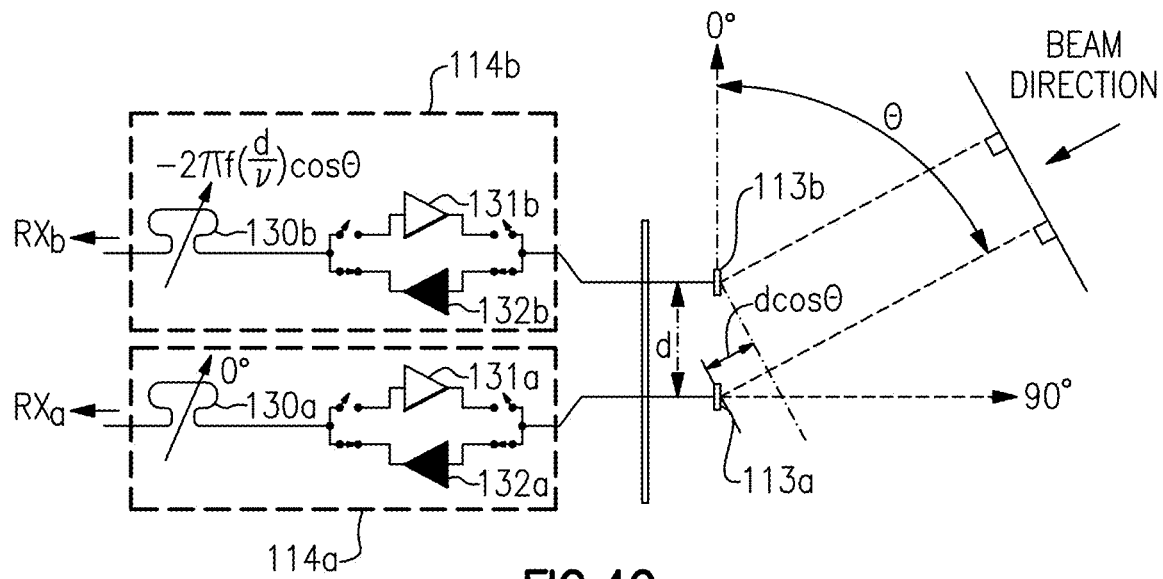
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130a and the second phase shifter 130b can be selected to about equal to $-2\pi f(d/v)\cos \Theta$ radians to achieve a desired receive beam angle Θ. In implementations in which the distance d corresponds to about $\frac{1}{2}\lambda$, the phase difference can be selected to about equal to $-\pi \cos \Theta$ radians to achieve a receive beam angle Θ.

Although various equations for phase values to provide beamforming have been provided, other phase selection values are possible, such as phase values selected based on implementation of an antenna array, implementation of signal conditioning circuits, and/or a radio environment.

Figure 5A:
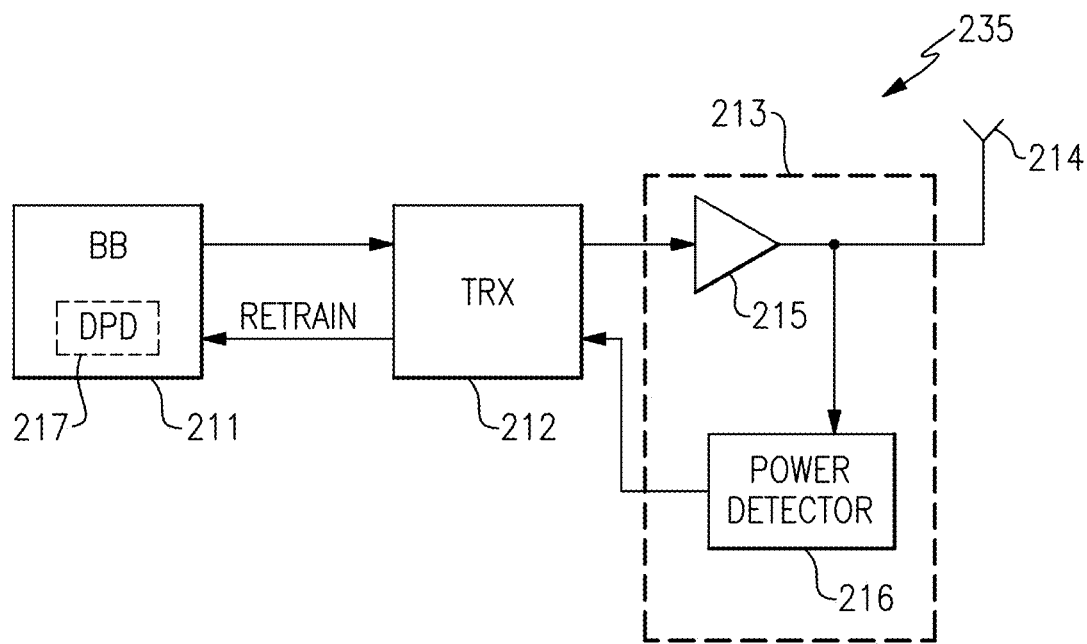
FIG. 5A is a schematic diagram of a communication system according to another embodiment.

FIG. 5A is a schematic diagram of a communication system 235 according to another embodiment. The communication system 235 includes a baseband processor 211, a transceiver 212, a front end system 213, and an antenna 214. The front end system 213 includes a power amplifier 215 and a power detector 216. The communication system 235 can correspond to a mobile device.

Digital pre-distortion (DPD) can be used to linearize a signal that is being transmitted by the communication system 235 by way of a transmit signal path. For example, nonlinearity from the power amplifier 215 and/or other components along the transmit signal path can lead to in-band distortion, which can be quantified by error vector magnitude (EVM). For instance, EVM is a direct measurement of modulation accuracy and transmitter performance that captures an error vector between a measured signal and its corresponding ideal point in a signal constellation, such as a 16 quadrature amplitude modulation (QAM) constellation.

Using DPD can provide a flexible and robust mechanism for enhancing performance of a wide variety of communication systems, including modern ultra-wideband communication systems.

DPD operates in the digital domain (for instance, by digital processing in a DPD engine 217 of the baseband processor 211) to construct a pre-distortion that is imposed on digital transmit data representing an RF signal that is being transmitted. The digital transmit data can be, for example, digital in-phase (I) and quadrature-phase (Q) signals that are subsequently converted to analog I and Q signals and modulated using an I/Q modulator to generate the RF signal for transmission. The pre-distortion provided by the DPD is anticipated to compensate for distortion arising from the power amplifier 215 and/or other components along the transmit signal path.

By using DPD, the power amplifier 215 and/or other components along the transmit signal path can operate in a normally less linear regime, thereby leading to enhancements in efficiency. For example, using DPD can lead to an enhancement in a figure of merit of the power amplifier 215, for instance, power added efficiency (PAE) and/or other measurements of the trade-off between amplifier linearity and efficiency.

In the illustrated embodiment, the power detector 216 detects an RF output power of the power amplifier, and provides a detection signal to the transceiver 212. Additionally, the transceiver 212 processes the detection signal to determine when to initiate a retraining sequence of the DPD engine 217 in the baseband processor 211. Accordingly, output power detection of the power amplifier 215 is used to detect output mismatch and a need to retrain DPD.

For example, if the antenna 214 is placed near a conducting plate, such as a metal table, a car dashboard, or other conductive structure, a significant mismatch will occur. The mismatch leads to a change in conducted power, and thus the measured conducted power by the power detector 216 will change by a detectable amount. A change in mismatch is associated with a change in linearity of the power amplifier 215, which can be compensated by initiating a re-training of the DPD.

After a change in mismatch presented to the antenna 214, it is expected that error vector magnitude (EVM) will degrade in a measurable way. DPD retraining will be initiated and applied, after which measured EVM will be improved compared to before re-training. Thus, retraining can be used to compensate for an antenna mismatch and a corresponding EVM degradation.

In implementations with multiple antennas, a select number of detectors that are independently monitoring for a change in power, can provide enough information to initiate a re-training without the need to monitor the RF output through the feedback receiver at regular intervals.

Figure 5B:
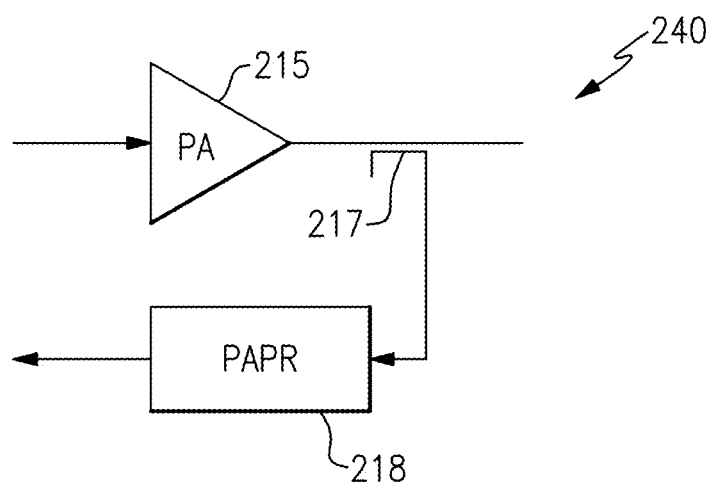
FIG. 5B is a schematic diagram of a power amplifier module according to one embodiment.

FIG. 5B is a schematic diagram of a power amplifier module 240 according to one embodiment. The power amplifier module 240 includes a power amplifier 215, a directional coupler 217, and a peak to average power detector 218.

In the illustrated embodiment, the directional coupler 217 generates a sensed signal based on sensing the RF output signal from the power amplifier 215. Additionally, the peak to average power detector 218 processes the sensed signal to generate a detection signal indicating a peak to average power ratio (PAPR) of the RF output signal. The detection signal is further processed to initiate a retraining of DPD of the power amplifier 215.

Monitoring changes in PAPR creates a sensitive indicator for distortion due to mismatch, and is especially well-suited for modern high PAPR waveforms as those used in Wi-Fi and 5G NR.

Thus, the power amplifier module 240 is implemented with PAPR detection to deal with mismatch and to relaunch the DPD training sequence as needed. By implementing the power amplifier module 240 in this manner, improved efficiency is realized by identifying times at which a retraining of the DPD is desirable. Such mismatch can arise from a variety of sources, including, but not limited to, variation in voltage standing wave ratio (VSWR) at the output of the power amplifier 215 due to changes in operating environment and/or conditions.

Figure 5C:
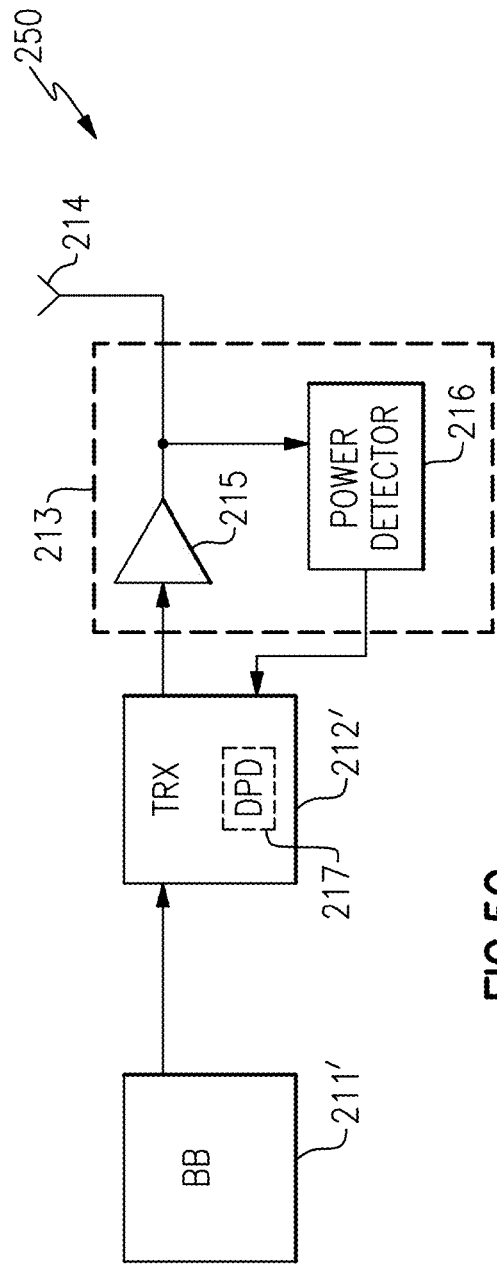
FIG. 5C is a schematic diagram of a communication system according to another embodiment.

FIG. 5C is a schematic diagram of a communication system 250 according to another embodiment. The communication system 250 includes a baseband processor 211', a transceiver 212', a front end system 213, and an antenna 214. The front end system 213 includes a power amplifier 215 and a power detector 216.

The communication system 250 of FIG. 5C is similar to the communication system 235 of FIG. 5A, except that in the communication system 250 the DPD engine 217 is implemented in the transceiver 212' rather than in a baseband processor. DPD can be performed anywhere in the digital domain of a communication system.

Figure 5D:
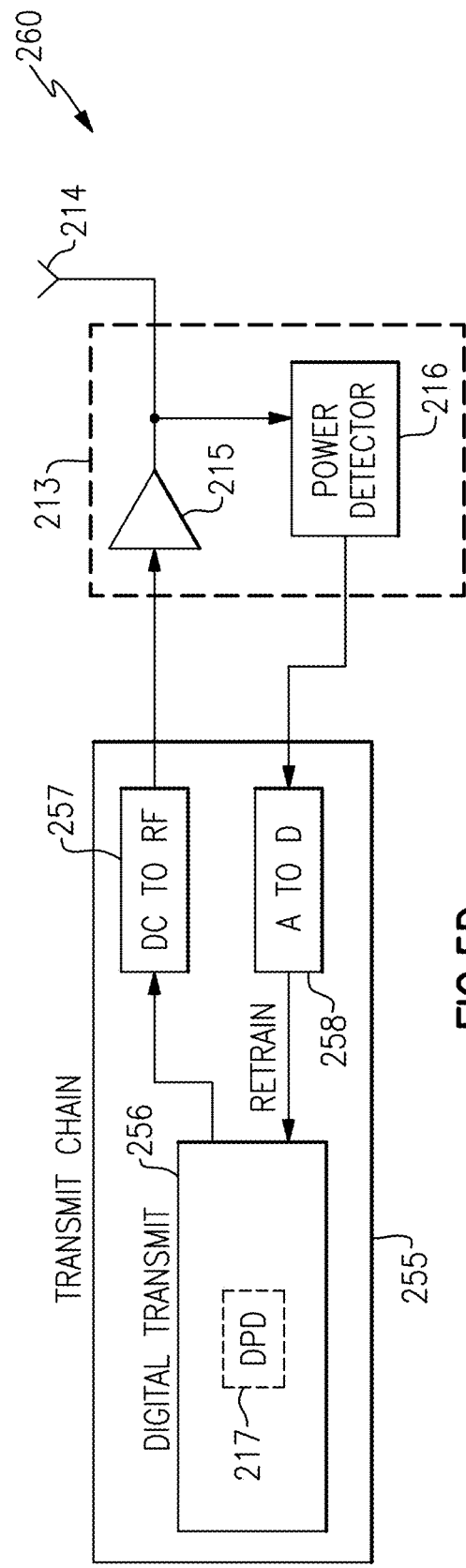
FIG. 5D is a schematic diagram of a communication system according to another embodiment.

FIG. 5D is a schematic diagram of a communication system 260 according to another embodiment. The communication system 260 includes a transmit chain 257, a front end system 213, and an antenna 214. The front end system 213 includes a power amplifier 215 and a power detector 216.

As shown in FIG. 5D, the transmit chain 257 includes a digital transmit circuit 256, a DC to RF component 257 (for example, a modulator or RF DAC), and an analog to digital component 258 (for example, an ADC).

The digital transmit circuit 256 generates a digital transmit signal that is shaped by the DPD engine 217. The digital transmit signal is converted by the DC to RF component 257 to generate an RF input signal for the front end system 213. A retraining of the DPD engine 217 is initiated by retraining data outputted by the A to D component 258, which receives the power detection signal from the power detector 216.

The digital transmit circuit 256 can include digital transmit circuitry associated with a baseband processor and/or transceiver. In one example, the digital transmit circuit 256 is implemented in accordance with the embodiment of FIG. 5A. In another example, the digital transmit circuit 256 is implemented in accordance with the embodiment of FIG. 5C.

Figure 5E:
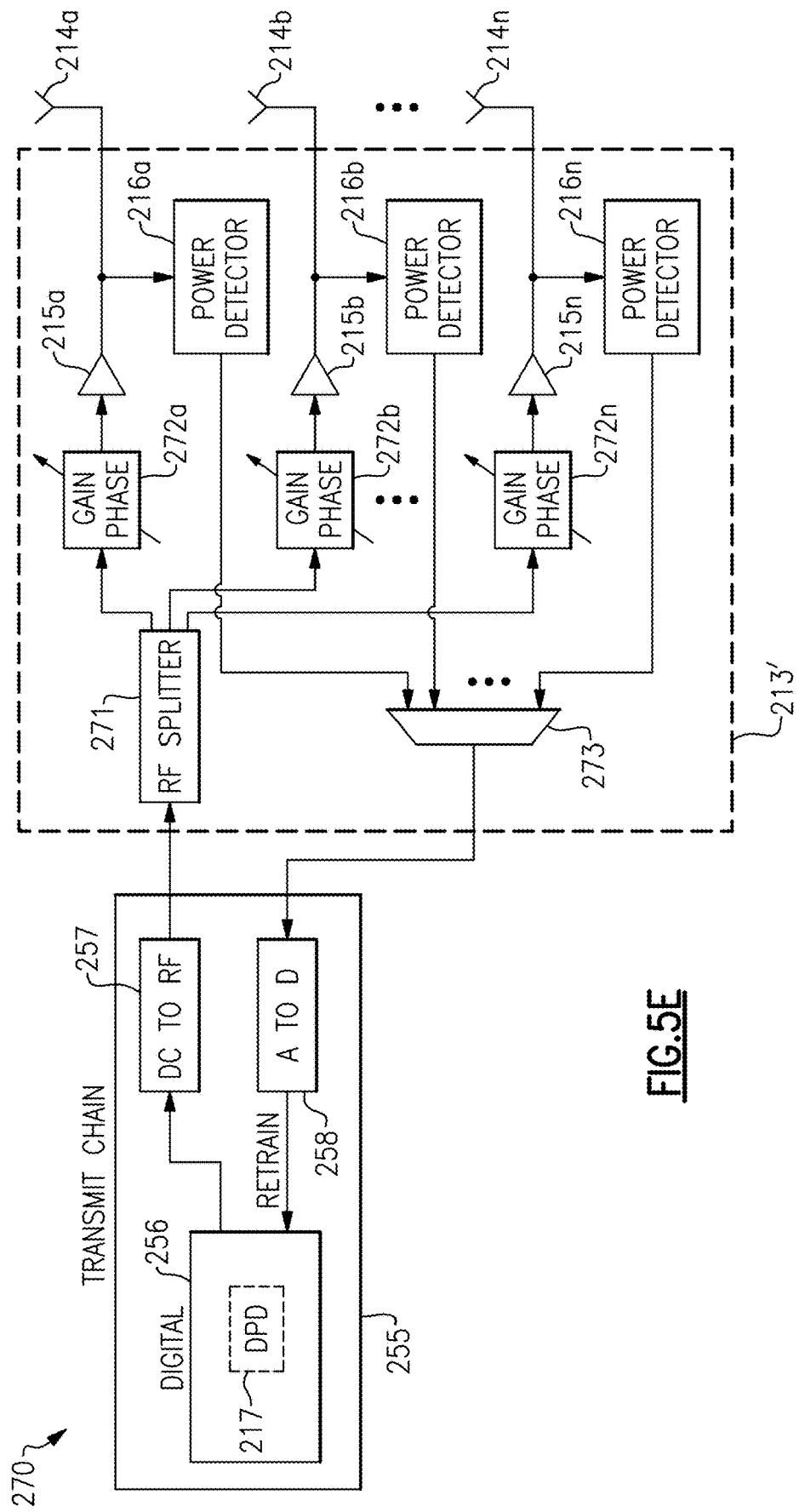
FIG. 5E is a schematic diagram of a communication system according to another embodiment.

FIG. 5E is a schematic diagram of a communication system 270 according to another embodiment. The communication system 270 includes a transmit chain 257, a front end system 213', and an antenna array including antennas 214a, 214b, . . . 214n.

The front end system 213' includes an RF splitter 271, gain and phase adjustment circuits 272a, 272b, . . . 272n, power amplifiers 215a, 215b, . . . 215n, power detectors 216a, 216b, . . . 216n, and a multiplexer 273. Any number n (for example, 2 or more) signal channels can be included in this embodiment.

In comparison to the communication system 235 of FIG. 5A, the communication system 270 of FIG. 5E includes multiple antennas and corresponding signal conditioning circuits to perform beamforming. In particular, the communication system 235 includes n channels.

As shown in FIG. 5E, the RF splitter 271 is used to split an RF input signal from the transmit chain 255 to generate RF input signals for each of the gain and phase adjustment circuits 272a, 272b, . . . 272n. The gain and phase adjustment circuits 272a, 272b, . . . 272n provide separate gain and phase adjustments to provide gain and phase settings for beamforming a transmit beam.

In certain implementations, the RF input signals provided to the power amplifiers 215a, 215b, . . . 215n correspond to FR2 signals or millimeter wave signals. Table 1 below depicts various examples of 5G FR2 frequency bands, and correspond to example frequency bands for the RF input signals provided to the power amplifiers 215a, 215b, . . . 215n.

TABLE 1

| 5G Frequency Band | Band Duplex Type | UL/DL Low [MHz] | UL/DL High [MHz] |
|---|---|---|---|
| n257 | TDD | 26500 | 29500 |
| n258 | TDD | 24250 | 27500 |
| n259 | TDD | 39500 | 43500 |
| n260 | TDD | 37000 | 40000 |
| n261 | TDD | 27500 | 28350 |
| n262 | TDD | 47200 | 48200 |
| n263 | TDD | 57000 | 71000 |

In the illustrated embodiment, power detectors 216a, 216b, . . . 216n are included for detecting the power of each of the power amplifiers 215a, 215b, . . . 215n, respectively. Additionally, the multiplexer 273 selects a desired power detection signal to provide to the transmit chain 255 at a given time. However, other implementations are possible.

FIG. 5F is a schematic diagram of a communication system 280 according to another embodiment. The communication system 280 includes a transmit chain 257, a front end system 213", and an antenna array including antennas 214a, 214b, . . . 214n.

The front end system 213" includes an RF splitter 271, gain and phase adjustment circuits 272a, 272b, . . . 272n, power amplifiers 215a, 215b, . . . 215n, and a power detector 216a.

The communication system 280 of FIG. 5F is similar to the communication system 270 of FIG. 5E, except that the communication system 270 includes the front end system 213" which does not include a power detector for every power amplifier. Rather, a subset of the power amplifiers are implemented with a power detector.

In implementations with multiple antennas, a select number of detectors (which can be as few as one as shown in FIG. 5F) monitor for a change in power, and can provide sufficient information to initiate a re-training.

FIG. 5G is a schematic diagram of an RF module 300 according to one embodiment. The RF module 300 includes a module substrate 301 to which a power amplifier module (PAM) 302 and one or more antennas 303 are attached. The RF module 300 corresponds to an antenna module, in this embodiment.

The PAM 302 includes one or more power amplifiers and one or more power detectors for generating a PAPR signal that is provided as an output to the PAM 302 and as an output of the RF module 300. In certain implementations, the PAM 302 is implemented with receive functionality, and thus can include low noise amplifiers (LNAs) and/or other receive circuity in some implementations.

Figure 6A:
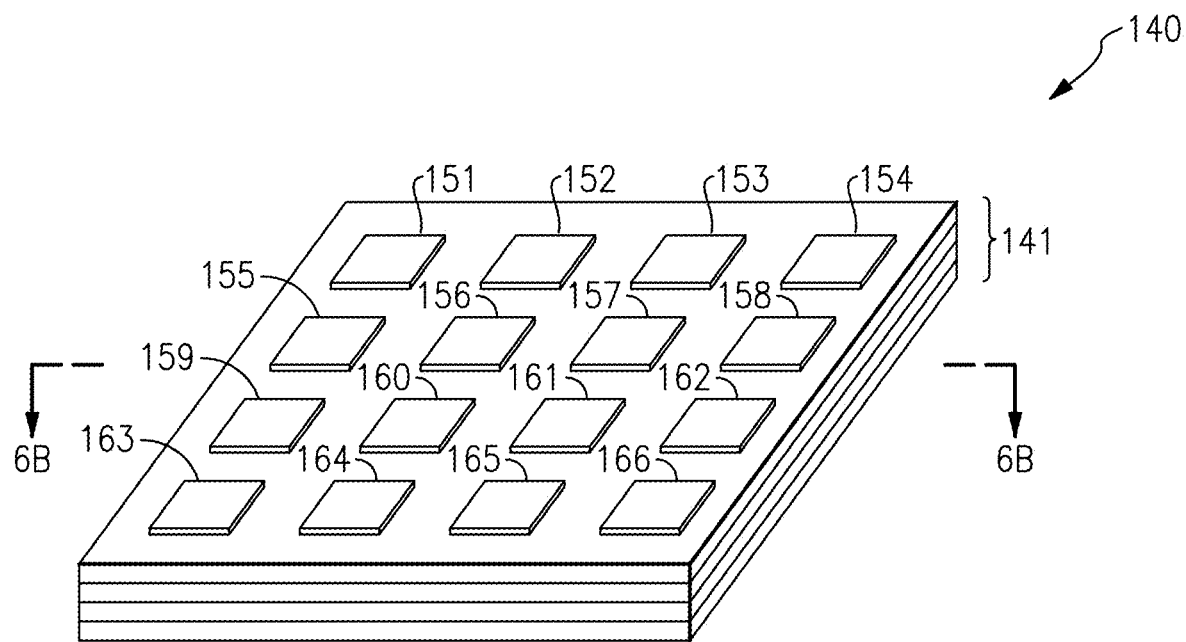
FIG. 6A is a perspective view of one embodiment of a module that operates with beamforming.
Figure 6B:
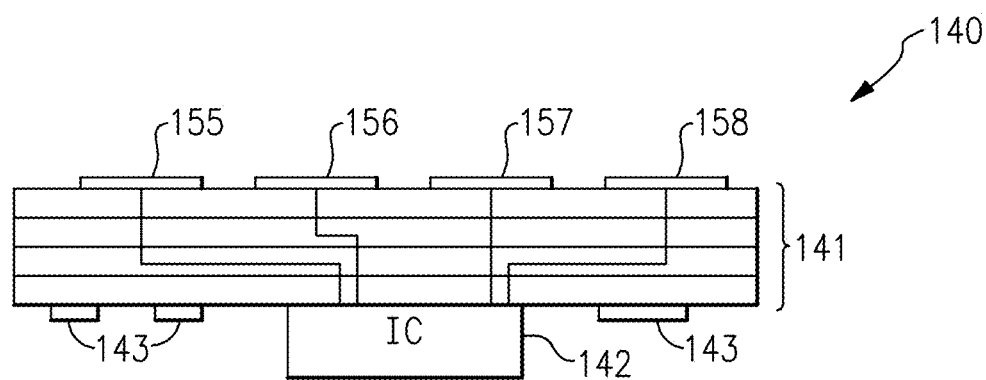
FIG. 6B is a cross-section of the module of FIG. 6A taken along the lines 6B-6B.

FIG. 6A is a perspective view of one embodiment of a module 140 that operates with beamforming. FIG. 6B is a cross-section of the module 140 of FIG. 6A taken along the lines 6B-6B.

The module 140 includes a laminated substrate or laminate 141, a semiconductor die or IC 142, surface mount components 143, and an antenna array including patch antenna elements 151-166.

Although one embodiment of a module is shown in FIGS. 6A and 6B, the teachings herein are applicable to modules implemented in a wide variety of ways. For example, a module can include a different arrangement of and/or number of antenna elements, dies, and/or surface mount components. Additionally, the module 140 can include additional structures and components including, but not limited to, encapsulation structures, shielding structures, and/or wirebonds.

In the illustrated embodiment, the antenna elements 151-166 are formed on a first surface of the laminate 141, and can be used to transmit receive signals or to transmit and receive signals. Although the illustrated antenna elements 151-166 are rectangular, the antenna elements 151-166 can be shaped in other ways. Additionally, although a 4×4 array of antenna elements is shown, more or fewer antenna elements can be provided. Moreover, antenna elements can be arrayed in other patterns or configurations. Furthermore, in another embodiment, multiple antenna arrays are provided, such as separate antenna arrays for transmit and receive and/or multiple antenna arrays for MIMO and/or switched diversity.

In certain implementations, the antenna elements 151-166 are implemented as patch antennas. A patch antenna can include a planar antenna element positioned over a ground plane. A patch antenna can have a relatively thin profile and exhibit robust mechanical strength. In certain configurations, the antenna elements 151-166 are implemented as patch antennas with planar antenna elements formed on the first surface of the laminate 141 and the ground plane formed using an internal conductive layer of the laminate 141.

Although an example with patch antennas is shown, a module can include any suitable antenna elements, including, but not limited to, patch antennas, dipole antennas, ceramic resonators, stamped metal antennas, and/or laser direct structuring antennas.

In the illustrated embodiment, the IC 142 and the surface mount components 143 are on a second surface of the laminate 141 opposite the first surface.

The IC 142 includes signal conditioning circuits associated with the antenna elements 151-166 and one or more power detectors in accordance with the teachings herein.

In certain implementations, the IC 142 includes a serial interface, such as a mobile industry processor interface radio frequency front-end (MIPI RFFE) bus and/or inter-integrated circuit ($I^2C$) bus that receives data for controlling the signal conditioning circuits, such as the amount of phase shifting provided by phase shifters. In another embodiment, the IC 142 includes an integrated transceiver.

The laminate 141 can be implemented in a variety of ways, and can include for example, conductive layers, dielectric layers, solder masks, and/or other structures. The number of layers, layer thicknesses, and materials used to form the layers can be selected based on a wide variety of factors, which can vary with application. The laminate 141 can include vias for providing electrical connections to signal feeds and/or ground feeds of the antenna elements 151-166. For example, in certain implementations, vias can aid in providing electrical connections between signaling conditioning circuits of the IC 142 and corresponding antenna elements.

The module 140 can be included in a communication system, such as a mobile phone or base station. In one example, the module 140 is attached to a phone board of a mobile phone.

Figure 7:
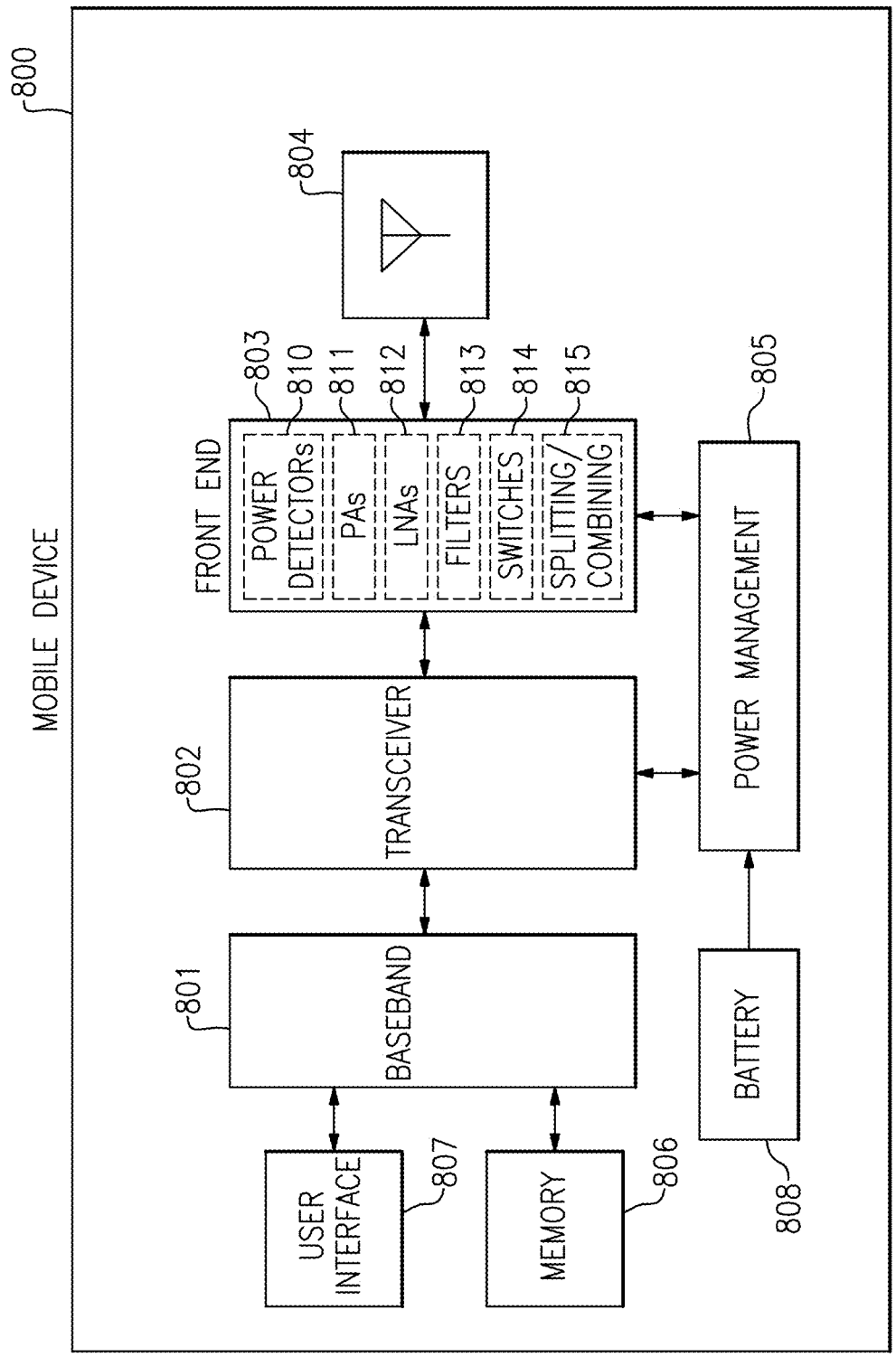
FIG. 7 is a schematic diagram of one embodiment of a mobile device.

FIG. 7 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 7 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes one or more power detectors 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 7, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 7, the power management system 805 receives a battery voltage from the battery 808. The battery 808 can be any suitable battery for use in the mobile device 800, including, for example, a lithium-ion battery.

Figure 8A:
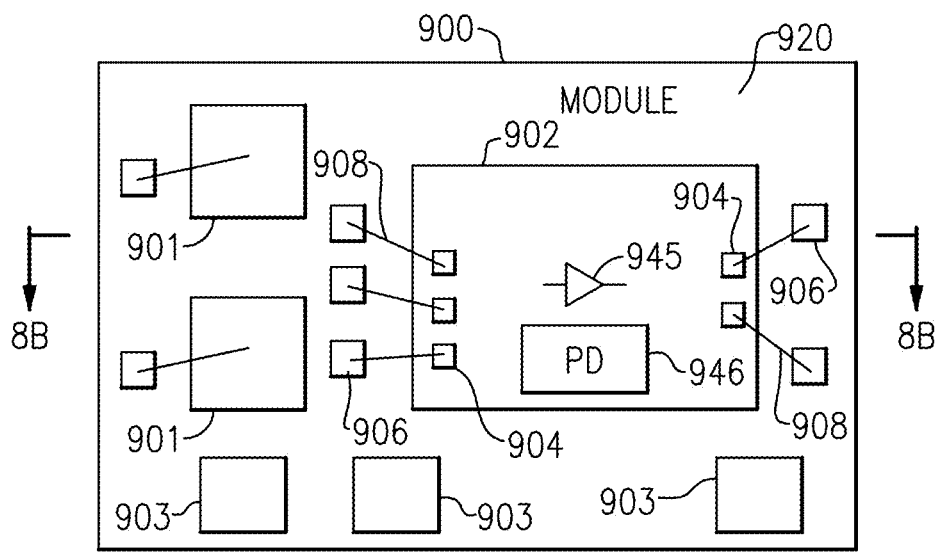
FIG. 8A is a schematic diagram of one embodiment of a packaged module.
Figure 8B:
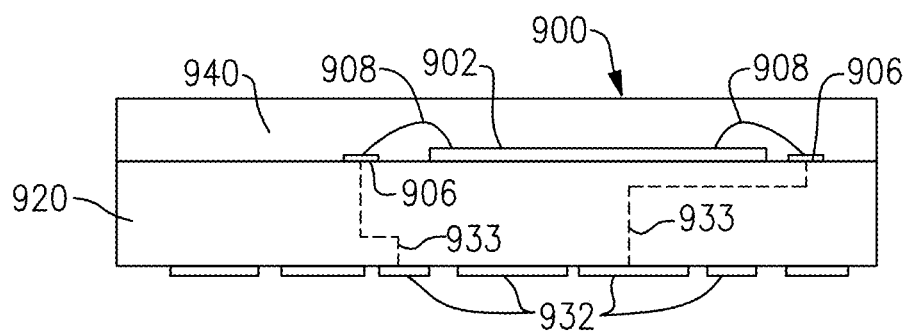
FIG. 8B is a schematic diagram of a cross-section of the packaged module of FIG. 8A taken along the lines 8B-8B.

FIG. 8A is a schematic diagram of one embodiment of a packaged module 900. FIG. 8B is a schematic diagram of a cross-section of the packaged module 900 of FIG. 8A taken along the lines 8B-8B.

The packaged module 900 includes radio frequency components 901, a semiconductor die 902, surface mount devices 903, wirebonds 908, a package substrate 920, and an encapsulation structure 940. The package substrate 920 includes pads 906 formed from conductors disposed therein. Additionally, the semiconductor die 902 includes pins or pads 904, and the wirebonds 908 have been used to connect the pads 904 of the die 902 to the pads 906 of the package substrate 920.

The semiconductor die 902 includes at least one power amplifier 945 and at least one power detector 946, which can be implemented in accordance with one or more features disclosed herein.

The packaging substrate 920 can be configured to receive a plurality of components such as radio frequency components 901, the semiconductor die 902 and the surface mount devices 903, which can include, for example, surface mount capacitors and/or inductors. In one implementation, the radio frequency components 901 include integrated passive devices (IPDs).

As shown in FIG. 8B, the packaged module 900 is shown to include a plurality of contact pads 932 disposed on the side of the packaged module 900 opposite the side used to mount the semiconductor die 902. Configuring the packaged module 900 in this manner can aid in connecting the packaged module 900 to a circuit board, such as a phone board of a mobile device. The example contact pads 932 can be configured to provide radio frequency signals, bias signals, and/or power (for example, a power supply voltage and ground) to the semiconductor die 902 and/or other components. As shown in FIG. 8B, the electrical connections between the contact pads 932 and the semiconductor die 902 can be facilitated by connections 933 through the package substrate 920. The connections 933 can represent electrical paths formed through the package substrate 920, such as connections associated with vias and conductors of a multilayer laminated package substrate.

In some embodiments, the packaged module 900 can also include one or more packaging structures to, for example, provide protection and/or facilitate handling. Such a packaging structure can include overmold or encapsulation structure 940 formed over the packaging substrate 920 and the components and die(s) disposed thereon.

It will be understood that although the packaged module 900 is described in the context of electrical connections based on wirebonds, one or more features of the present disclosure can also be implemented in other packaging configurations, including, for example, flip-chip configurations.

Figure 9A:
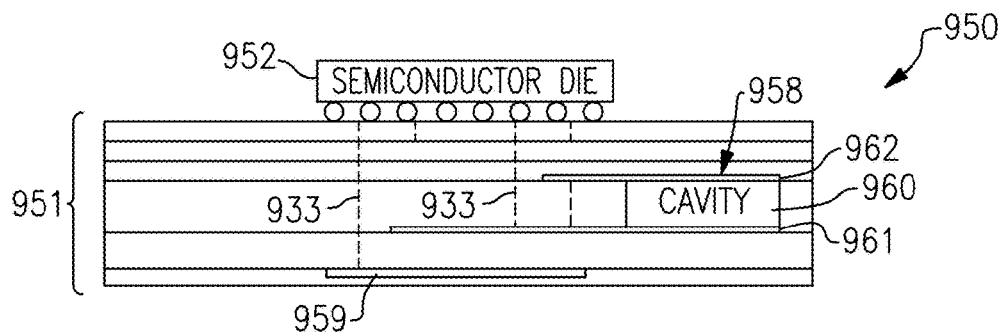
FIG. 9A is a schematic diagram of a cross-section of another embodiment of a packaged module.

FIG. 9A is a schematic diagram of a cross-section of another embodiment of a packaged module 950. The packaged module 950 includes a laminated package substrate 951 and a flip-chip die 952.

The laminated package substrate 951 includes a cavity-based antenna 958 associated with an air cavity 960, a first conductor 961, a second conductor 962. The laminated package substrate 951 further includes a planar antenna 959.

In certain implementations herein, a packaged module includes one or more integrated antennas. For example, the packaged module 950 of FIG. 9A includes the cavity-based antenna 958 and the planar antenna 959. By including antennas facing in multiple directions (including, but not limited to, directions that are substantially perpendicular to one another), a range of available angles for communications can be increased. Although one example of a packaged module with integrated antennas is shown, the teachings herein are applicable to modules implemented in a wide variety of ways.

Figure 9B:
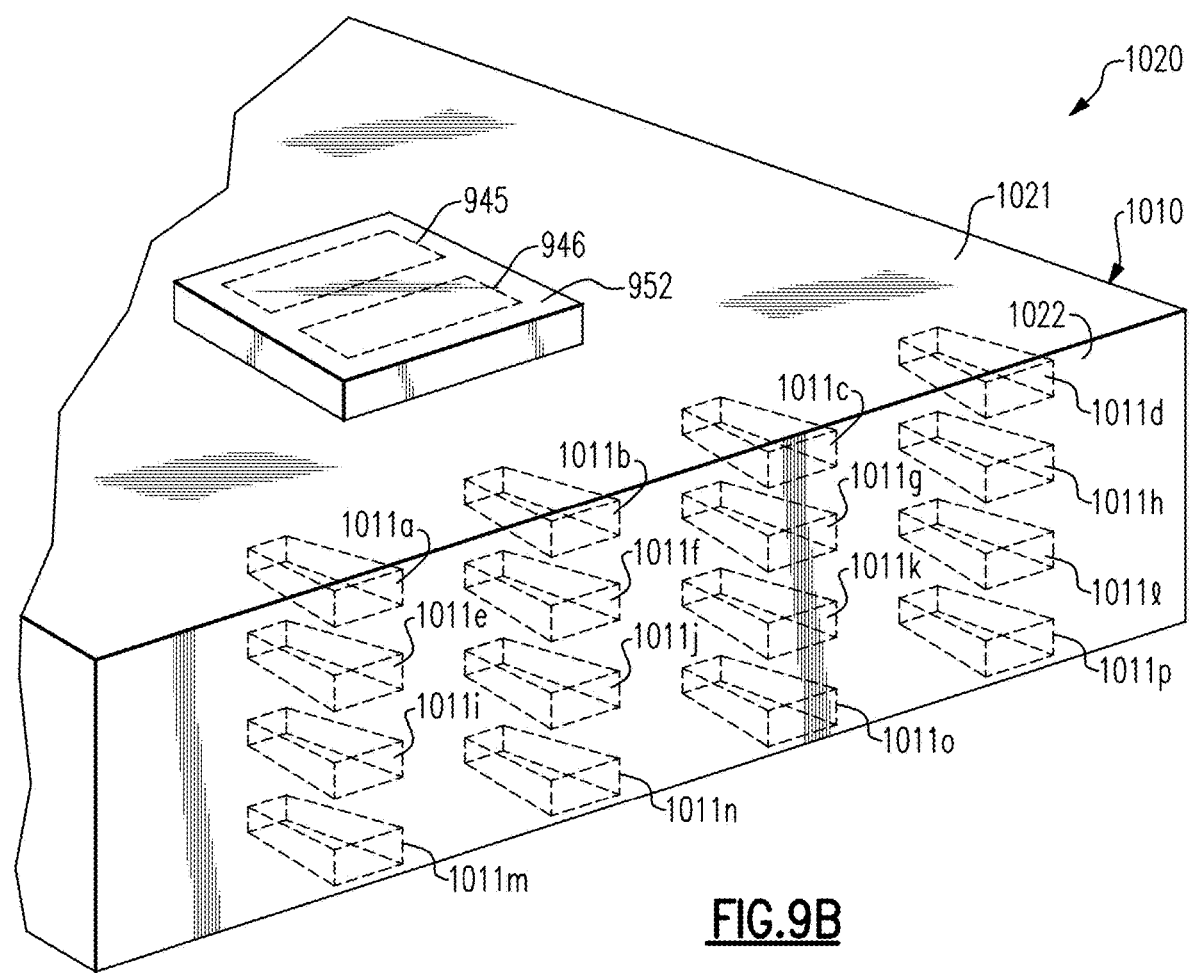
FIG. 9B is a perspective view of another embodiment of a packaged module.

FIG. 9B is a perspective view of another embodiment of a packaged module 1020. The module 1020 includes a laminated substrate 1010 and a semiconductor die 1012. The semiconductor die 1012 includes at least one power amplifier 945 and at least one power detector 946. In certain implementations, the semiconductor die 1012 includes other RF circuitry 946, which can include, for example, variable gain amplifiers (VGAs), controllable phase shifters, switches, filters, and/or transceivers.

In the illustrated the embodiment, cavity-based antennas 1011*a*-1011*p* have been formed on an edge 1022 of the laminated substrate 1010. In this example, sixteen cavity-based antennas have been provided in a four-by-four (4×4) array. However, more or fewer antennas can be included and/or antennas can be arrayed in other patterns.

In another embodiment, the laminated substrate 1010 further include another antenna array (for example, a patch antenna array) formed on a second major surface of the laminated substrate 1010 opposite the first major surface 1021. Implementing the module 1020 aids in increasing a range of angles over which the module 1020 can communicate.

The module 1020 illustrates another embodiment of a module including an array of antennas that are controllable to provide beamforming. Implementing an array of antennas on a side of module aids in communicating at certain angles and/or directions that may otherwise be unavailable due to environmental blockage. Although an example with cavity-based antennas is shown, the teachings herein are applicable to implementations using other types of antennas.

Applications

Some of the embodiments described above have provided examples in connection with wireless devices or mobile phones. However, the principles and advantages of the embodiments can be used for any other systems or apparatus that have needs for power amplifiers.

Such power amplifiers can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
a transmit chain configured to generate a transmit signal and to convert the transmit signal to a radio frequency input signal, the transmit chain including a digital pre-distortion circuit operable to provide digital pre-distortion to the transmit signal; and
a front end system including a first power amplifier configured to amplify the radio frequency input signal to generate a radio frequency output signal, and a power detector configured to generate a detection signal based on detecting an output power of the first power amplifier, the detection signal operable to control initiation of a retraining sequence of the digital pre-distortion circuit in response to detecting a mismatch between an antenna and the first power amplifier.

2. The mobile device of claim 1 wherein the power detector is a peak to average power detector.

3. The mobile device of claim 1 wherein the antenna is configured to transmit the radio frequency output signal.

4. The mobile device of claim 1 wherein the front end system includes a plurality of power amplifiers including the first power amplifier, the mobile device further comprising an antenna array configured to radiate a transmit beam in response to receiving a plurality of radio frequency output signals from the plurality of power amplifiers.

5. The mobile device of claim 4 wherein the front end system includes a plurality of power detectors each configured to provide output power detection to a corresponding one of the plurality of power amplifiers.

6. The mobile device of claim 4 wherein one or more of the plurality of power amplifiers are not coupled to any power detector.

7. The mobile device of claim 1 wherein the transmit chain is configured to process the detection signal to generate a retraining control signal for the digital pre-distortion circuit.

8. A radio frequency transmit system for a mobile device, the radio frequency transmit system comprising:
a digital pre-distortion circuit operable to provide digital pre-distortion to a transmit signal;
a digital to radio frequency converter configured to convert the transmit signal to a radio frequency input signal; and
a power amplifier module including a first power amplifier configured to amplify the radio frequency input signal to generate a radio frequency output signal, and a power detector configured to generate a detection signal based on detecting an output power of the first power amplifier, the detection signal operable to control initiation of a retraining sequence of the digital pre-distortion circuit in response to detecting a mismatch between an antenna and the first power amplifier.

9. The radio frequency transmit system of claim 8 wherein the power detector is a peak to average power detector.

10. The radio frequency transmit system of claim 8 the antenna is configured to transmit the radio frequency output signal.

11. The radio frequency transmit system of claim 10 wherein the antenna and the power amplifier module are implemented on a common radio frequency module.

12. The radio frequency transmit system of claim 8 wherein the power amplifier module includes a plurality of power amplifiers including the first power amplifier, the radio frequency transmit system further comprising an antenna array configured to radiate a transmit beam in response to receiving a plurality of radio frequency output signals from the plurality of power amplifiers.

13. The radio frequency transmit system of claim 12 wherein the radio frequency transmit system includes a plurality of power detectors each configured to provide output power detection to a corresponding one of the plurality of power amplifiers.

14. The radio frequency transmit system of claim 12 wherein one or more of the plurality of power amplifiers are not coupled to any power detector.

15. A method of digital pre-distortion in a mobile device, the method comprising:
generating a transmit signal using a digital transmit circuit of a transmit chain;
providing digital pre-distortion to the transmit signal using a digital pre-distortion circuit of the digital transmit circuit;
converting the transmit signal to a radio frequency input signal using a digital to radio frequency of the transmit chain;
amplifying the radio frequency input signal to generate a radio frequency output signal using a first power amplifier; and
generating a detection signal based on detecting an output power of the first power amplifier using a power detector, the detection signal operable to control initiation of a retraining sequence of the digital pre-distortion circuit in response to detecting a mismatch between an antenna and the first power amplifier.

16. The method of claim 15 wherein generating the detection signal includes performing peak to average power detection.

17. The method of claim 15 further comprising transmitting the radio frequency output signal on the antenna.

18. The method of claim 15 further comprising providing a plurality of radio frequency output signals from a plurality of power amplifiers to an antenna array, the plurality of power amplifiers including the first power amplifier.

19. The method of claim 15 further comprising providing output power detection for each of the plurality of power amplifiers.

20. The method of claim 15 further comprising providing output power detection for only a subset of the plurality of power amplifiers.

* * * * *